United States Patent
Chen et al.

(10) Patent No.: US 9,503,777 B2
(45) Date of Patent: Nov. 22, 2016

(54) METHOD AND SYSTEM FOR UNIFIED START CODE EMULATION PREVENTION BITS PROCESSING FOR AVS

(75) Inventors: Xuemin (Sherman) Chen, San Diego, CA (US); Zhijie (Michael) Yang, Beijing (CN)

(73) Assignee: BROADCOM CORPORATION, Irvine, CA (US)

(*) Notice: Subject to any disclaimer, the term of this patent is extended or adjusted under 35 U.S.C. 154(b) by 2507 days.

(21) Appl. No.: 12/116,519

(22) Filed: May 7, 2008

(65) Prior Publication Data

US 2008/0304757 A1  Dec. 11, 2008

Related U.S. Application Data

(60) Provisional application No. 60/942,061, filed on Jun. 5, 2007.

(51) Int. Cl.
*G06K 9/36* (2006.01)
*G06K 9/46* (2006.01)
(Continued)

(52) U.S. Cl.
CPC ........ *H04N 21/434* (2013.01); *H04N 21/4147* (2013.01); *H04N 21/4334* (2013.01);
(Continued)

(58) Field of Classification Search
CPC .................. H04N 19/70; H04N 19/184; H04N 21/8455; H04N 21/23424; H04N
(Continued)

(56) References Cited

U.S. PATENT DOCUMENTS 6,529,550 B2 * 3/2003 Tahara et al. ................. 375/240
7,720,096 B2 * 5/2010 Klemets ....................... 370/466
(Continued)

FOREIGN PATENT DOCUMENTS

| EP | 1 753 244 | 2/2007 |
|---|---|---|
| JP | 01 117578 | 5/1989 |
| KR | 1020040099461 | 11/2004 |

OTHER PUBLICATIONS

European Search Report corresponding to European Patent Application Serial No. 08009826.2-1247, mailed Aug. 5, 2008, 4 pages.
(Continued)

*Primary Examiner* — Phuoc Tran
(74) *Attorney, Agent, or Firm* — Foley & Lardner LLP; Joseph N. Ziebert; Helen H. Zhang

(57) ABSTRACT

Aspects of a method and system for unified start code emulation prevention bits processing for AVS are provided. A Start code emulation prevention bit string with an arbitrary bit string length, for example 2 bits, may be inserted into AVS encoded data. When decoding, the received AVS encoded data may be parsed to identify the start code emulation prevention bit string and start codes. A bit processor may be signaled with the detection of the start code emulation prevention bit string and/or the start codes. The bit processor may remove the start code emulation prevention bit string in a decoding process and store the detected start codes for applications such as PVR. Constraints may be added to streams such as unbounded PES and/or TS with PUSI bit unset for further bit processing.

25 Claims, 11 Drawing Sheets

(51) Int. Cl.
*H04N 21/434* (2011.01)
*H04N 21/4147* (2011.01)
*H04N 21/433* (2011.01)
*H04N 21/438* (2011.01)
*H04N 21/44* (2011.01)
*H04N 21/845* (2011.01)

(52) U.S. Cl.
CPC .... *H04N 21/4382* (2013.01); *H04N 21/44008* (2013.01); *H04N 21/8455* (2013.01)

(58) Field of Classification Search
CPC ............. 21/2343;H04N 21/44008; H04N 21/4147; H04N 21/4334; H04N 21/434; H04N 21/4382
USPC ............ 382/232, 233; 375/240.25, 240.26
See application file for complete search history.

(56) References Cited

U.S. PATENT DOCUMENTS

2003/0043919 A1  3/2003  Haddad
2003/0215019 A1  11/2003  Iganami
2004/0030665 A1*  2/2004  Sullivan .......................... 706/48

OTHER PUBLICATIONS

Fan et al., "Overview of AVS Video Standard", 2004 IEEE International Conference on Multimedia and Expo (ICME), Jun. 27-Jun. 30, 2004, 4 pages.

* cited by examiner

METHOD AND SYSTEM FOR UNIFIED START CODE EMULATION PREVENTION BITS PROCESSING FOR AVS

CROSS-REFERENCE TO RELATED APPLICATIONS/INCORPORATION BY REFERENCE

This patent application makes reference to, claims priority to and claims the benefit from U.S. Provisional Patent Application Ser. No. 60/942,061 filed on Jun. 5, 2007.

The above reference application is hereby incorporated herein by reference in its entirety.

FIELD OF THE INVENTION

Certain embodiments of the invention relate to video signal processing. More specifically, certain embodiments of the invention relate to a method and system for unified start code emulation prevention bits processing for AVS.

BACKGROUND OF THE INVENTION

The Audio Video Coding Standard of China (AVS) video standard is a streamlined, highly efficient video coder employing the latest video coding tools and dedicated to high definition and high quality video services. AVS provides video coding algorithms comprising an optimization between absolute coding performance and complexity of implementation. Examples of AVS applications may be such as Various broadcast TV, HD-DVD, and broadband video networking content may utilize the AVS video standard.

The AVS specification defines an AVS bitstream syntax and specifies a process required for decoding an AVS bitstream. The AVS bitstream may be carried in a format of an elementary stream (ES), a packetized elementary stream (PES), and/or a transport stream (TS). A start code based AVS bitstream structure has been adopted in the AVS specification. Each AVS unit, for example, ES, PES, and/or TS, begins with a unique start code and comprises application data. The unique start code enables a parser in a decoder to effectively access compressed video unit for various applications. The application data may be in an arbitrary pattern in the payload. The start code is a uniquely-valued string of bytes. The unique string of bytes provides a pattern the presence of which indicates a resynchronization point. In the AVS specification, the start code prefix structure starts at a byte-aligned position and has 23 0's followed by a 1, that is, 00000000 00000000 00000001. Every occurrence of the bit pattern 00000000 00000000 00000001 may be considered as the detection of a start code.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for unified start code emulation prevention bits processing for AVS, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for unified start code emulation prevention bits processing for AVS. Various aspects of the invention may provide inserting a start code emulation prevention bit string with an arbitrary bit string length, for example, 2 bits, in AVS encoded data. The AVS encoded data comprising the inserted start code emulation prevention bit string may be processed and communicated via a transmission medium and/or via a storage medium. During decoding, the AVS encoded data may be parsed to identify the start code emulation prevention bit string and start codes. During parsing, when the start code emulation prevention bit string and/or start codes are detected, a signal or other indications may be communicated to a bit processor. The bit processor may remove or ignore the identified start code emulation prevention bit string and proceed with decoding of the encoded data. The detected start codes may be stored and may be utilized for various applications such as personal video recording (PVR). The AVS encoded data comprising the inserted start code emulation prevention bit string may be communicated via an elementary stream (ES), a packetized elementary stream (PES), and/or a transport stream (TS). For unbounded PES and TS with payload_unit_start_indicator (PUSI) bit unset, constraints may be added to the corresponding streams to enable processing via the same bit processor. Exemplary constraints may comprise (1) a corresponding PES header may not be ended with a bit string of 00001 and/or (2) a corresponding PES header may be only inserted directly before the start codes of the unbounded PES.

Figure 1:
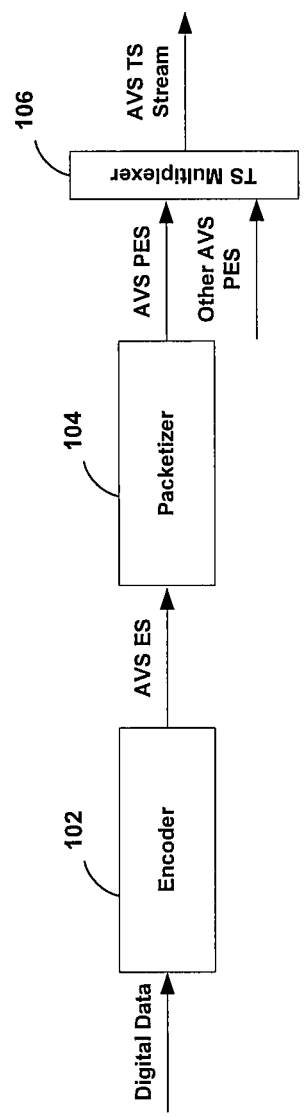
FIG. 1 is a block diagram of an exemplary system that enables generation of AVS transport stream (TS), in accordance with an embodiment of the invention.

FIG. 1 is a block diagram of an exemplary system that enables generation of AVS transport stream (TS), in accordance with an embodiment of the invention. Referring to FIG. 1, there is shown an encoder 102, a packetizer 104, and a TS multiplexer 106.

The encoder 102 may comprise suitable logic, circuitry and/or code that may be operable to compress input digital data into an AVS elementary stream (ES) per the AVS standard. The compression methods used may depend on the type of the input digital data. Exemplary input digital data may comprise video data, audio data, audio/video data, text data, computer executable program data, archival data, and database information. The AVS ES may be continuous compressed digital audio, video or data. The audio may comprise music and/or voice information.

The packetizer 104 may comprise suitable logic, circuitry and/or code that may packetize continuous compressed digital audio, video or data such as the AVS ES, to produce a packetized elementary stream (PES). The packetizer 104 may be operable to split the AVS ES into data chunks and add a data envelope for each data chunk to form an AVS PES packet. Each AVS PES packet may comprise a PES header and a PES payload. The PES header may begin with a byte-aligned start code followed by other fields to give, for example, error protection, and enable random access to the AVS PSE packet. The start code may define a specific pattern of bytes that may be used to identify the start of a new AVS PES packet. The PES payload of the AVS PES packet may comprise the data of the AVS ES, but may be in different format depending on the type of data such as video or audio. The pattern of the data in the PES payload may be random and may be possible to comprise the same pattern that one may use for the start code. This is so-called the "start code emulation", which may cause false detection of start codes. In this regard, to prevent the start code emulation, the data pattern in the PES payload may be enforced to differ from the start code pattern by inserting a start code emulation prevention bit string with an arbitrary bit string length, for example, 2 bits, in instances when a "start code-like" pattern may be found in the corresponding PES payload. A "start code-like" pattern is any sequence of bits that may be similar to the start code. The start code emulation prevention bit string may be identified, and then removed or ignored at some point for the proper interpretation of the other data in the PES payload since the arbitrary length bit string is not be byte oriented, that is, the arbitrary length bit string is a string that is not a byte and is not a multiple of a byte. The start code-defined data boundaries may be located correctly by identifying the start code.

The TS multiplexer 106 may comprise suitable logic, circuitry and/or code that may be operable to receive an output PES from the packetizer 104 and multiplex packets of packetized elementary streams to produce a single transport stream (TS). The single transport stream may be suitable for transmission over a medium and/or for storage. The TS may be a continuous string of TS packets comprising portion or whole of an AVS PES packet. A TS packet may comprise no more than one AVS PES packet.

In operation, a quantity of digital data intended for transmission may be first compressed at the encoder 102 to an AVS ES which may be continuous digital audio, video or data. The resulting AVS ES may be packetized to AVS PES packets at the packetizer 104 by encapsulating portion of the AVS ES data into the AVS PES payload and adding a PES packet header beginning with a start code. In instances when a "start code-like" pattern may be found within the AVS PSE payload, a start code emulation prevention bit string with an arbitrary length such as two bits may be inserted into the AVS PSE payload to avoid start code emulation. The AVS PSE from the packetizer 104 may be time division multiplexed with other AVS PSE at the TS multiplexer 106 to form a single transport stream comprising a continuous string of TS packets. The arbitrary length bit string a string that is not a byte and is not a multiple of a byte.

Figure 2:
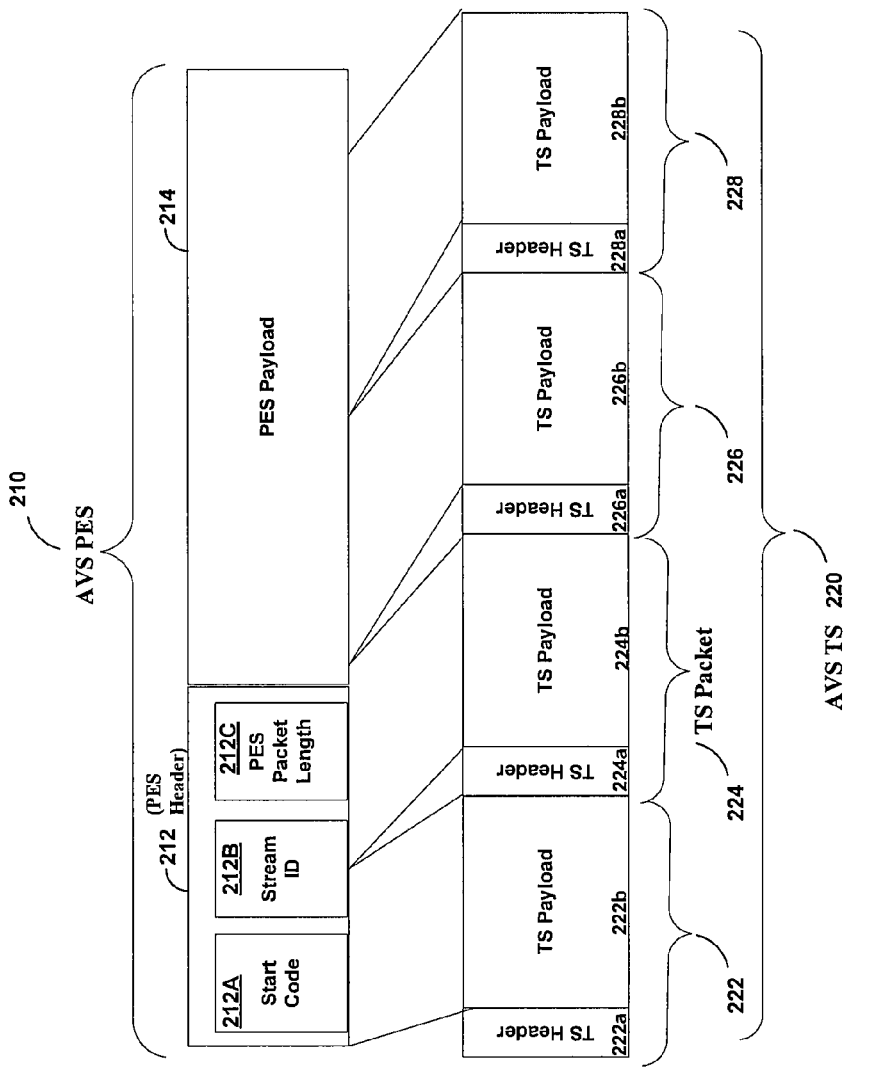
FIG. 2 is a block diagram of an exemplary AVS stream format, in accordance with an embodiment of the invention.

FIG. 2 is a block diagram of an exemplary AVS stream format, in accordance with an embodiment of the invention. Referring to FIG. 2, there is shown an AVS PES packet 210, and an AVS TS 220. The AVS PES packet 210 may comprise a PES header 212 and a PES payload 214. The PES header 212 may comprise a start code 212A, a stream ID 212B and a PES packet length 212C. The AVS TS 220 may comprise various AVS TS packets 222, 224, 226, and 228. Each AVS TS packet such as the AVS TS packet 222 may comprise a TS header 222a and a TS payload 222b.

The AVS PES packet 210 may begin with the PES header 212, which may be proceeded by the unique start code 212A followed by the stream ID 212B and the PES packet length 212C. The start code 212 may be a byte-aligned unique code with a value of 0x000001. The start code 212 may be used as synchronization markers or references to provide synchronization and/or resynchronization to byte boundaries. The stream ID 212B may assign the AVS PSE packet 210 to a particular elementary stream (ES) and define the elementary stream type such as 0x02 for a video stream and 0x02 for an audio stream. The PES packet length 212C may indicate the length of the PES payload 214 in bytes.

The PES payload 214 may comprise portion of the ES data. The format of the PES payload 214 may differ for video ES and audio ES. The pattern of the ES data may be arbitrary and it may be possible that the ES data may, in and of itself, comprise the same pattern that one may use as the start code 212A, which may cause false detection of the start code 212A at a decoder. To avoid the start code emulation, a bit of the ES may be placed in the PES payload 214 up to the 2nd LSB of a byte. With an occurrence of 22"0"s ahead of the 2nd LSB of the current byte, a start code emulation prevention bit string of "10" may be inserted as the last two bits of the current byte. The syntax of the PES payload 218 may not comprise 23 0's in a location not for the start code 212. Every occurrence of 23 0's may be the start code 212A such that a decoder may be able to accurately detect the start code 212A.

The AVS TS 220 may comprise a string of TS packets such as 222, 224, 226, and 228. Each TS packet, for example, the TS packet 222, may comprise a TS header 222a and a TS payload 222b. The TS header 222a may be used for TS packet synchronization, payload identification, and may provide additional decoding information such as the packet identifier which may be used to identify the transport packets comprising information relevant to a single PES stream.

The TS payload 222b may comprise one or more AVS PES packets 210. The entire contents of the AVS PES packet 210 may be divided into smaller pieces and inserted into the payload regions of the TS packets. Byte stuffing may be used in instances where the AVS PES packet 210 may not be able to fit into an integer number multiple of the size of the TS payload 22b. The hexadecimal value FF (0xFF) may be inserted into the AVS TS packet 222 until the TS packet payload 222b may be full.

Figure 3:
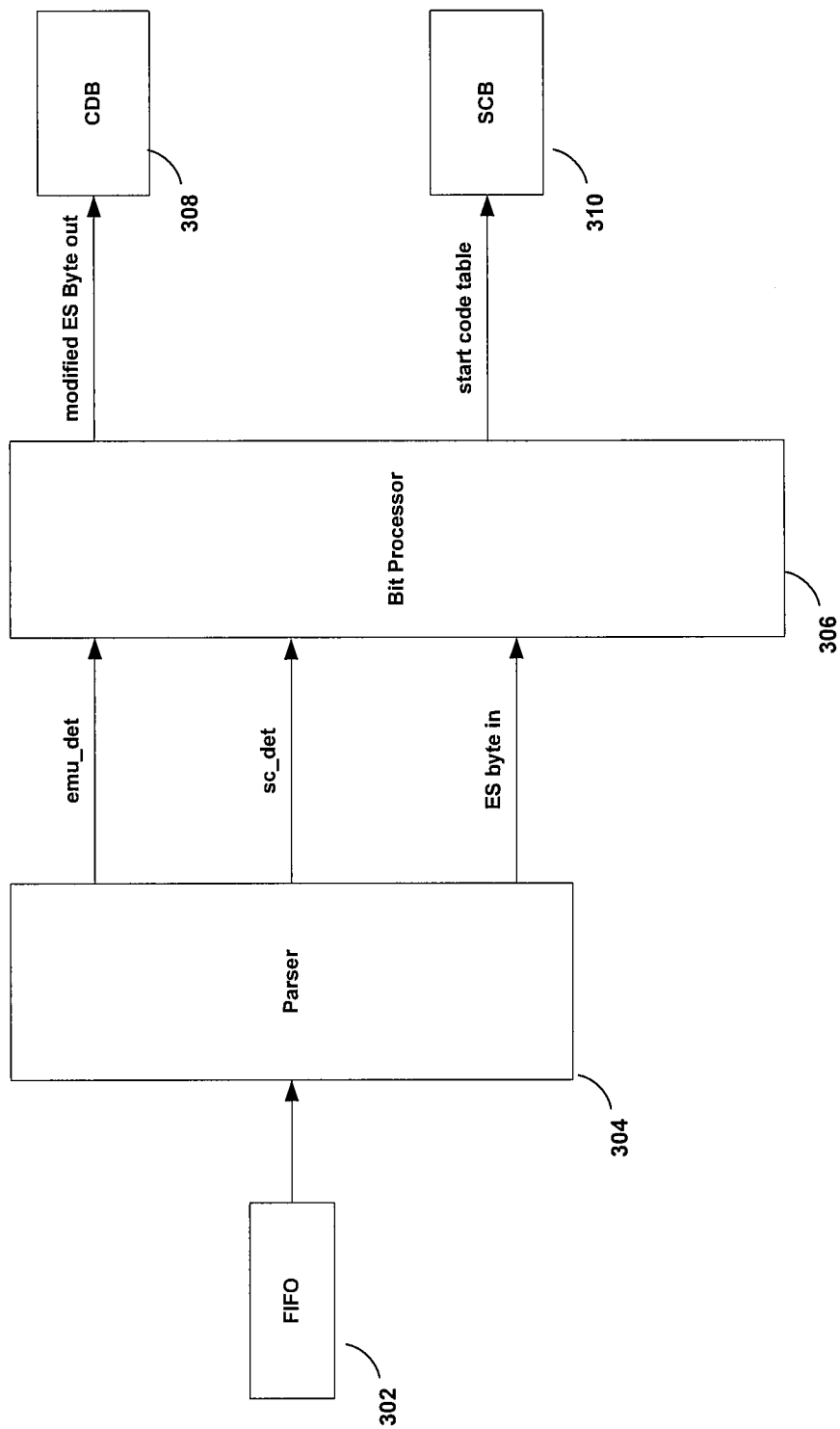
FIG. 3 is a block diagram of an exemplary unified start code emulation prevention bit processor, in accordance with an embodiment of the invention.

FIG. 3 is a block diagram of an exemplary unified start code emulation prevention bit processor, in accordance with an embodiment of the invention. Referring to FIG. 3, there is shown a FIFO 302, a parser 304, a bit processor 306, a CDB 308, and a SCB 310.

The FIFO 302 may comprise suitable logic, circuitry and/or code that may be operable to buffer the incoming bitstream in a form of first-in-first-out. The FIFO 302 may be designed to make a bit processing rate greater than the maximum incoming bit rate to ensure that the FIFO 302 may not full.

The parser 304 may comprise suitable logic, circuitry and/or code that may be operable to parse the incoming bitstream and provide a byte-aligned bitstream. Specifically, in instances when the parser 304 may read a byte from the incoming stream, the parser 304 may count number of zeros up to the two preceding bytes. If successive 23 '0's may occur, the parser 304 may determine that a real start code has been detected and a start code detection flag (sc-det) may be set and signaled to the bit processor 306. If the parser 304 identifies an occurrence of successive 22 '0's, the parser 304 may determine that the following '1 0' bits as the start code emulation prevention bit string of "10" inserted. Upon the detection of the start code emulation prevention bit string, the parser 304 may be operable to signal or otherwise provide and indication to the bit processor 306 via setting of an emulation code detection flag (emu-det). The parser 304 may treat the remaining bits read from the incoming bitstream as continuation of the real data and signal this to the bit processor 306 via setting of, for example, an ES byte flag. An AVS PES such as the AVS PES 210 may comprise more than one startcodes. For example, the PES payload 214 of the AVS PES 210 may comprise the whole of the AVS ES data and the resulted AVS PES 210 may comprise startcodes for both the AVS PES 210 and the corresponding AVS ES, respectively. In this case, the parser 304 may be enabled to parse the PES startcodes and the AVS ES startcodes separately.

The bit processor 306 may comprise suitable logic, circuitry and/or code that may be enabled to process the byte-aligned bitstream for different computing elements. For example, the detection of the true start code 212 may enable the bit processor 306 to detect the true byte-alignment of the input data relative to the data boundaries or byte boundaries. The bit processor 306 may be operable to generate received start code information and discard the start code emulation prevention bit string to compose new bytes. An incomplete byte may be maintained at the bit processor 306 by padding residual bits.

The CDB 308 may comprise suitable logic, circuitry and/or code that may be operable as a coded data buffer to hold the coded data.

The SCB 310 may comprise suitable logic, circuitry and/or code that may be operable to store start code information in the corresponding code data. The stored start codes may be used to identify data boundaries for exemplary applications comprising personal video recorder (PVR).

In operation, an input bitstream may be first loaded into the FIFO 302. The parser 304 may read bytes from the FIFO 302, and may strip headers such as the TS header 222a and/or the PES header 212 if there may exist. The flag sc-det and the flag emu-det may be set to logic true with the detection of the start code 212 and the start code emulation prevention bit string, respectively. The parser 304 may set the flag ES byte to logic true for the rest bits read from the incoming bitstream. The flag sc-det, the flag emu-det, and the flag ES byte may be set so as to provide an indication to the bit processor 306. In instances where an AVS PES such as the AVS PES 210 from the FIFO 302 may comprise both an AVS PES startcode and an AVS ES startcode, the parser 304 may parse the PES startcode and the AVS ES startcode, respectively. The bit processor 306 may remove or ignore the start code emulation prevention bit string to compose modified bytes. An incomplete byte may be maintained by padding residual bits. The modified bytes may be outputted to the code data buffer (CDB) 308. The bit processor 306 may pass the received start codes to the start code buffer (SCB) 310 and the received start codes may be stored in the start code buffer (SCB) 310.

Figure 4:
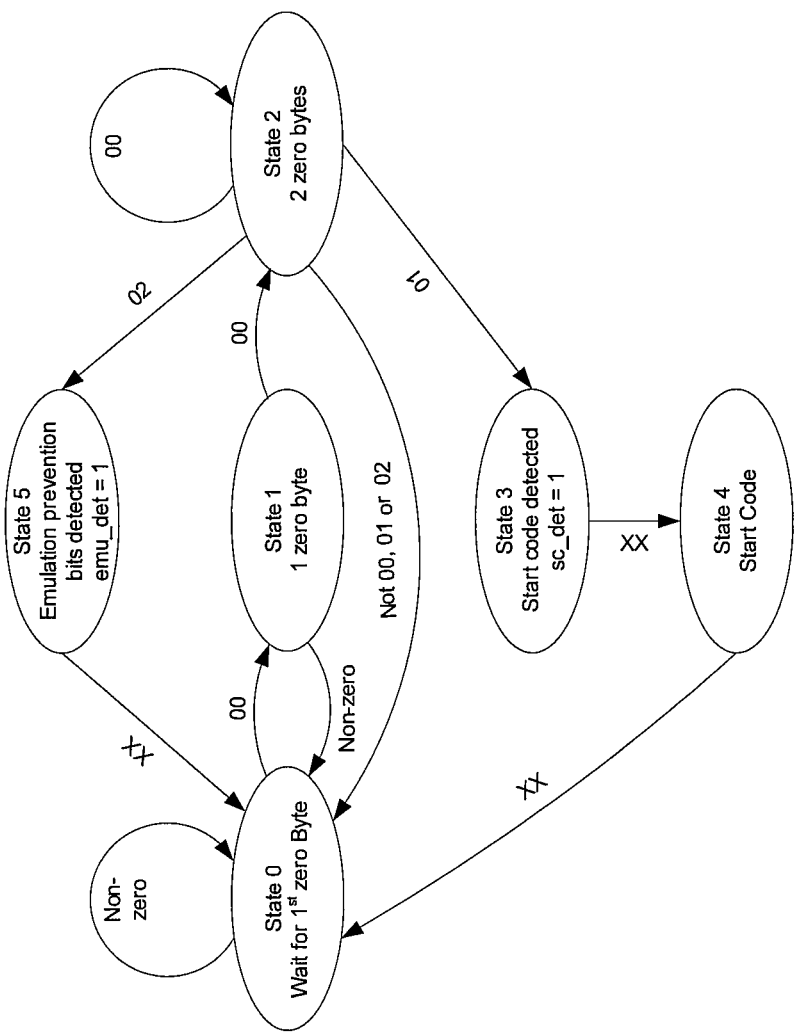
FIG. 4 is a state diagram illustrating exemplary AVS ES parser operation, in accordance with an embodiment of the invention.

FIG. 4 is a state diagram illustrating exemplary AVS ES parser operation, in accordance with an embodiment of the invention. Referring to FIG. 4, there is shown an exemplary state machine with a state 0, a state 1, a state 2, a state 3, a state 4, and a state 5, a flag sc_det and a flag emu_det.

In the state 0, the AVS ES parser may be waiting for the first zero bytes coming. In the state 1, the AVS ES parser may have received one zero bytes. In the state 2, the AVS ES parser may have received 2 successive zero bytes. In the state 3, a start code may be detected. In the state 4, the first start code of a received bitstream may be detected. In the state 5, the start code emulation prevention bit string may be detected in the received bitstream. The flag sc_det may be set for the bit processor 306 to indicate the detection of start code bits. The flag emu_det may be set for the bit processor 306 to indicate the detection of the start code emulation prevention bits string.

The state machine may transition among different states according to different input byte values. The state machine may be reset and start with the state 0. In the state 0, an input of "00" may result in a transition the state 0 to the state 1, otherwise the state machine may stay in the state 0. In the state 1, an input of "00" may result in a transition from the state 1 to the state 2, otherwise, the state machine may be reset to the state 0. In the state 2, an input of "00" may keep the state machine in the state 2, and an input of "01" may result in a transition from the state 2 to the state 3. Furthermore, an input of "02" may result in a transition from the state 2 to the state 5. Otherwise, the state machine may be reset to the state 0.

In the state 3, a start code may have been detected and the flag sc_det may be set so as to provide an indication to the bit processor 306 to signal the detection of the start code. A transition may occur from state 3 to the state 4 with upcoming two arbitrary input bytes. In the state 4, a transition may occur to the state 0 following two arbitrary bytes for a new PES of the received bitstream. In the state 5, the start code emulation prevention bit string may have been detected and the flag emu_det may be set for the bit processor 306, so as to signal or indicate the detection of the start code emulation prevention bit string.

Figure 5:
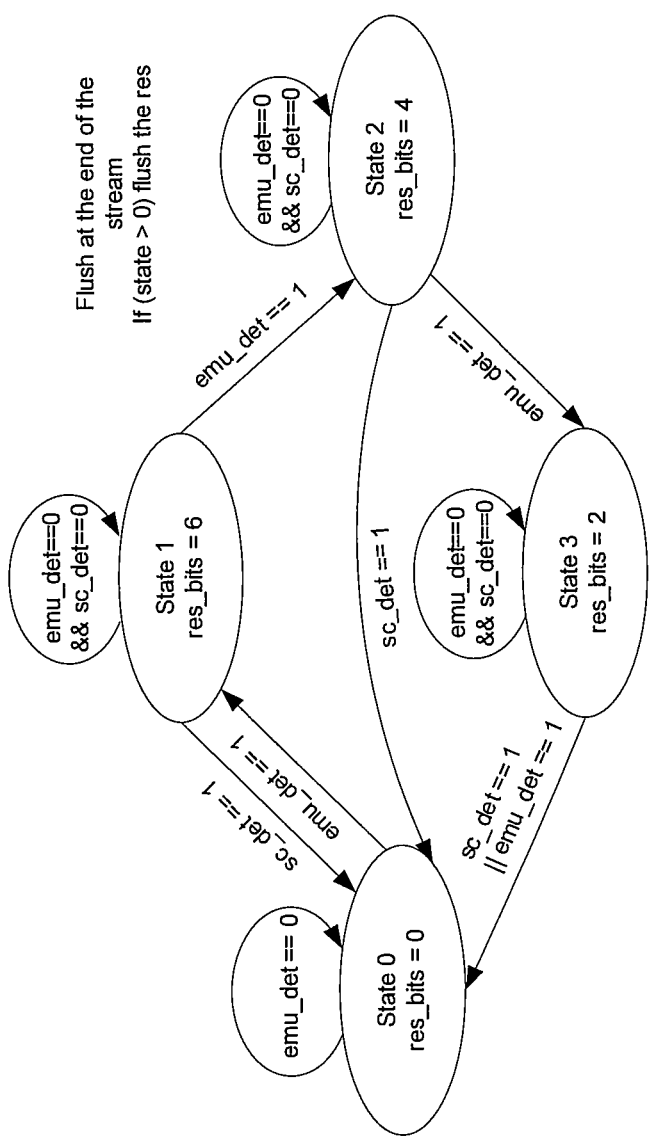
FIG. 5 is a state diagram illustrating exemplary AVS ES Bit-processor operation, in accordance with an embodiment of the invention.

FIG. 5 is a state diagram illustrating exemplary AVS ES Bit-processor operation, in accordance with an embodiment of the invention. Referring to FIG. 5, there is shown an exemplary state machine with a state 0, a state 1, a state 2, and a state 3, a counter res_bits, a flag sc_det, and a flag emu_det.

The counter res_bits may represent the number of bits of an incomplete byte buffered in the bit processor 306. The flag sc_det and the flag emu_det may be defined the same as described in the FIG. 4. In the state 0, the AVS ES bit processor may have no incomplete byte buffered and res- _bits=0. In the state 1, the AVS ES bit processor may have one incomplete byte buffered and res_bits=6. In the state 2, the AVS ES bit processor may have one incomplete byte buffered and res_bits=4. In the state 3, the AVS ES bit processor may have one incomplete byte buffered and res_bits=2.

The state machine may transition among different states according to different input bit types such as the start code bits and the start code emulation prevention bit string. The state machine may be reset and start with the state 0. The state machine may stay in the state 0 in instances when no start code emulation prevention bit string may be detected (emu_det=0). The state machine may transition to the state 1 from the state 0 when the start code emulation prevention bit string may be detected (emu_det=1). In the state 1, the state machine may stay in the state 1 when both the start code emulation prevention bit string and the start code bits may not be detected (emu_det=0 && sc_det=0). The state machine may transition back to the state 0 from the state 1 with the detection of a start code (sc_det=1).

The state machine may transition to the state 2 from the state 1 in instances when the start code emulation prevention bit string may be detected (emu_det=1). In the state 2, the state machine may remain in the state 2 when both the start code emulation prevention bit string and the start code bits may not be detected (emu_det=0 && sc_det=0). The state machine may transition back to the state 0 from the state 2 in instances when a start code (sc_det=1) may be detected. The state machine may transition to the state 3 from the state 2 when the start code emulation prevention bit string may be detected (emu_det=1). In the state 3, the state machine may remain in the state 3 when both the start code emulation prevention bit string and a start code may not be detected (emu_det=0 && sc_det=0). The state machine may transition back to the state 0 from the state 3 when a start code or the start code emulation prevention bit string may be detected (sc_det=1||emu_det=1). In each state of the state machine, a start code entry may be added to the SCB 310 if the start code may be detected. The state machine may reset the counter res_bits at the end of each received stream.

Figure 6:
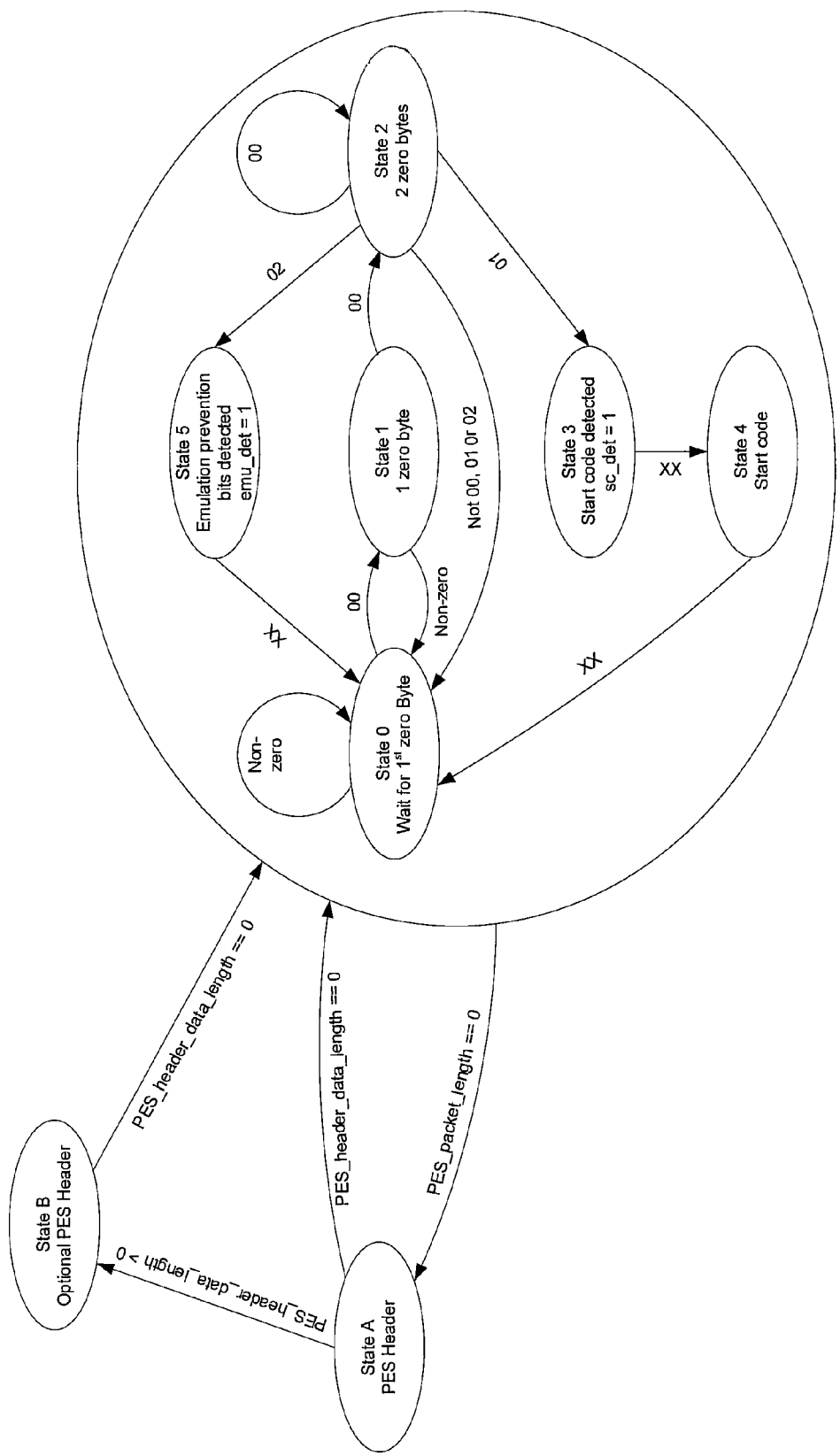
FIG. 6 is a state diagram illustrating exemplary bounded AVS ES parser operation, in accordance with an embodiment of the invention.

FIG. 6 is a state diagram illustrating exemplary bounded AVS ES parser operation, in accordance with an embodiment of the invention. Referring to FIG. 6, there is shown an exemplary state machine with a state A, a state B, a state 0, a state 1, a state 2, a state 3, a state 4, and a state 5. An AVS ES parser, which may be constrained by a data length of a PES header (PES_header_data_length), may be called a bounded AVS ES parser.

In state A, a PES header 212 may be checked at the bounded AVS PES parser. In the state B, an optional PES header may be checked at the bounded AVS PES parser. The state 0, the state 1, the state 2, the state 3, the state 4, and the state 5 may be defined the same as described in the FIG. 4.

The state machine may start with the state A when a PES header 212 is found. In the state A, the PES header 212 may be checked. The state machine may transition from the state A to the state B in instances when a data length of the PES header 212>0. The state machine may transition from the state A to the state 0 in instances where no PES header may be detected, that is, when the data length of the PES header 212=0. In the state B, the PES optional header field may be checked. The state machine may transition from the state B to the state 0 in instances when the data length of the PES optional header=0, that is, in instances when no PES optional header may be detected. The state machine may be reset and start with the state 0 for a new PES packet in the received bitstream. The state machine may operate similar to the operation described with respect FIG. 4. In this regard, the state machine may transition among the state 0 through the state 5 according to different input byte values except the PES packet length 212C may be checked at each of the states where a start code may be detected such as in the state 3 and the state 4. The detection of a zero for the PES packet length 216 may transition the state machine back to the state A from the corresponding states such as in the state 3 or the state 4. The bit processor 306 may be the same as described with respect to FIG. 5.

Figure 7:
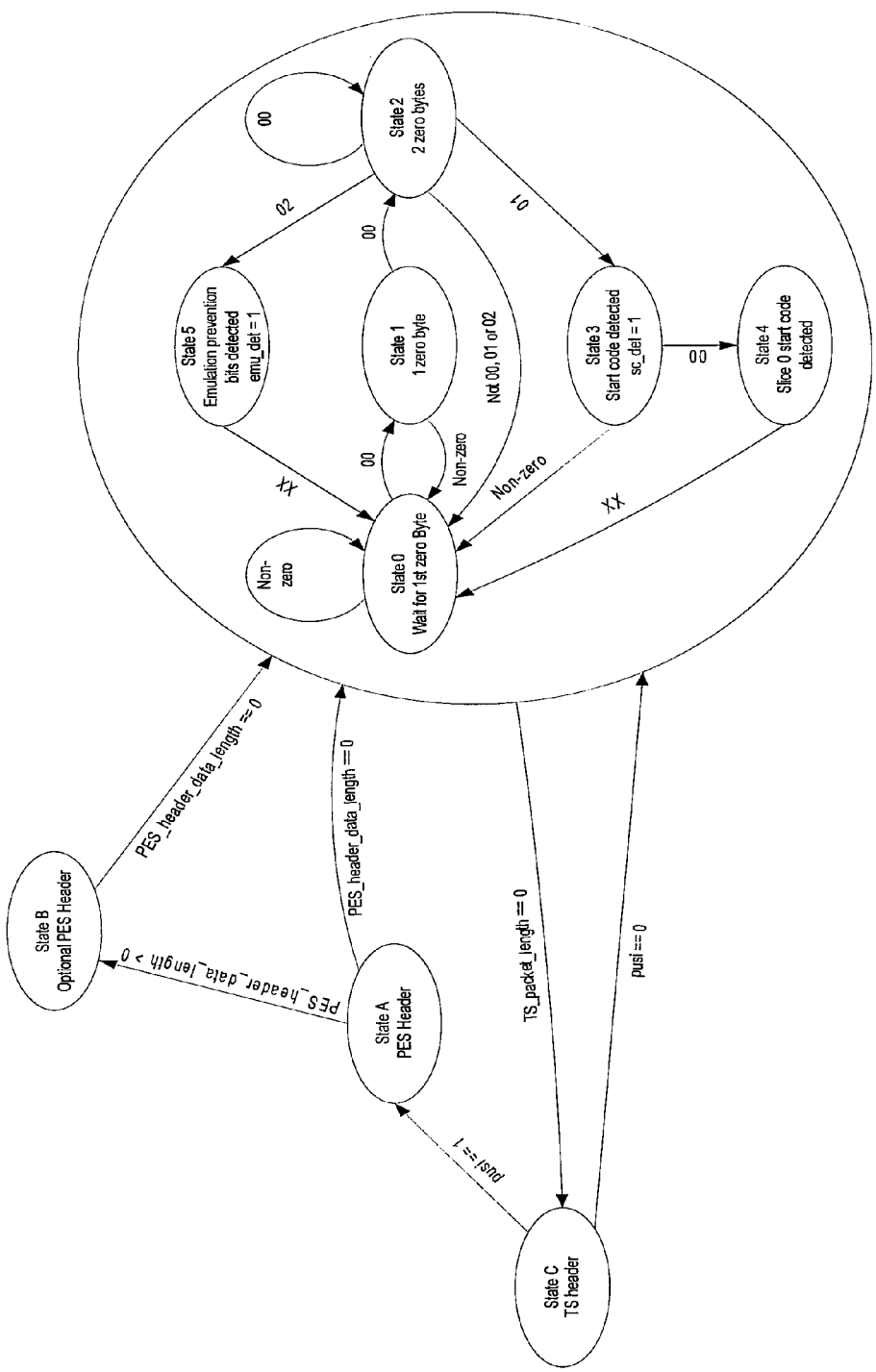
FIG. 7 is a state diagram illustrating exemplary AVS TS parser operation, in accordance with an embodiment of the invention.

FIG. 7 is a state diagram illustrating exemplary AVS TS parser operation, in accordance with an embodiment of the invention. Referring to FIG. 7, there is shown an exemplary state machine with a state A, a state B, a state C, a state 0, a state 1, a state 2, a state 3, a state 4, and a state 5.

In the state A, the AVS TS parser may detect a PES header such as PES header 212. In the state B, an optional PES header may be detected at the AVS TS parser. In the state C, a TS header such as 222a may be detected at the AVS TS parser. The state 0, the state 1, the state 2, the state 3, the state 4, and the state 5 may be similar as described in the FIG. 4.

The state machine may start with the state C when a TS packet with a packet_unit_start_indicator (PUSI) signals the start of a PES header such as PES header 212. The first byte of a TS payload may be the PES header 212 when PUSI=1, otherwise, no PES header may be in the current TS payload. The state machine may transition to the state A with PUSI=1 and to the state 0 with PUSI=0.

In the state A, the PES header 212 may be checked. The state machine may transition from the state A to the state B in instances when the data length of the PES header 212>0. The state machine may transition from the state A to the state 0 in instances when no PES header may be detected, that is, when the data length of the PES header 212=0. In the state B, the PES optional header field may be checked. The state machine may transition from the state B to the state 0 in instances when the data length of the PES optional header=0, that is, when no PES optional header may be detected at this time. In the state 0, the state machine may be reset and start with the state 0 for a new PES packet in the received bitstream.

The state machine may operate similar to the operation described with respect to FIG. 6 and to transition among the state 0 through the state 5, the state A and the state B according to different input byte values, except that the state 3 may return to the state 0 with upcoming two input bytes of "00" and the state 4 may transition to the state 0 with two arbitrary input bytes. Moreover, the TS packet length (TS payload) may be checked at each of the state 0 through the state 5. The detection of a zero for the TS packet length such as 224b may return the state machine back to the state C from the corresponding states such as the state 3 or the state 4. The bit processor 306 may be the same as described with respect to FIG. 5.

In AVS systems, some bitstreams such as an unbounded PES stream and a TS stream with PUSI bit unset may have PES packets identified with the bit pattern 0x000001E0~0x000001EF. For example, a bit pattern 0x000001000001E0 may appear in slice 0 of a picture, and 0x000001 may be interpreted as a video start code prefix followed by a PES header. To avoid this ambiguity, a restriction may be added to the bitstream during multiplexing. In this regard, the restriction may be added on the PES payload and/or the PES header such as, for example, the PES payload may not end with 000001 and/or the PES header may be inserted directly before the start code.

Figure 8:
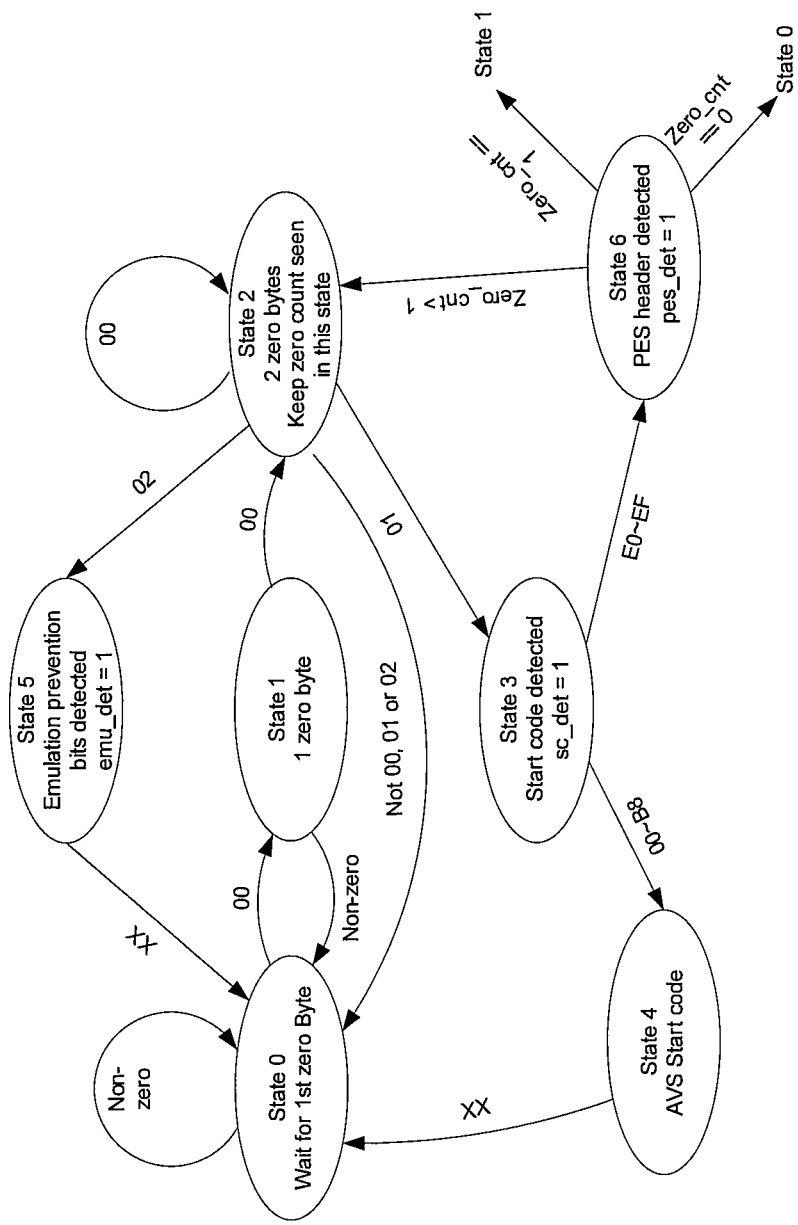
FIG. 8 is a state diagram illustrating exemplary unbounded PES parser with PES payload restriction operation, in accordance with an embodiment of the invention.

FIG. 8 is a state diagram illustrating exemplary unbounded PES parser with PES payload restriction operation, in accordance with an embodiment of the invention. Referring to FIG. 8, there is shown an exemplary state machine with a state 0, a state 1, a state 2, a state 3, a state 4, a state 5, and a state 6, a counter zero_cnt, a flag sc_det, a flag emu_det, and a flag pes_det.

In the state 0, the AVS PES parser may be waiting for the first zero bytes coming. In the state 1, the AVS PES parser may have received one zero bytes. In the state 2, the AVS PES parser may have received two successive zero bytes. In the state 3, a start code may be detected. In the state 4, the AVS start code, that is the first start code of a received bitstream, may be detected. In the state 5, the start code emulation prevention bit string may be detected in the received bitstream. In the state 6, a PES header may be detected. The counter zero_cnt may be used to count the number of zeros following the two received successive zeros received in the state 2. The flag sc_det may be set for the bit processor 306 to indicate the detection of start code bits. The flag emu_det may be set for the bit processor 306 to indicate the detection of the start code emulation prevention bit string. The flag pes_det may be set for the bit processor 306 to indicate the detection of a PES header.

The state machine may transition among different states according to different input byte values. The state machine may be reset and start with the state 0. In the state 0, an input of "00" may result in a transition from state 0 to the state 1. Otherwise the state machine may stay in the state 0. In the state 1, a transition from the state 1 to the state 2 with two input bytes "00" may occur. Otherwise, the state machine may be reset from the state 1 back to the state 0. In the state 2, an input of "00" may result in the state remaining in the state 2, an input of "01" may result in a transition from the state 2 to the state 3, and an input of "02" may result in a transition from the state 2 to the state 5. Otherwise, the state machine may be reset from the state 2 back to the state 0. The number of zeros (zero_cnt) received after the state machine in the state 2 may be counted.

In the state 3, a start code may be detected and the start code detection flag sc-det may be set to be logic true (1). The state machine may transition from the state 3 to the state 4 with two input bytes in the rage of "00"~"B8". The state machine may transition from the state 3 to the state 6 with two input bytes in the rage of "E0" ~"EF". In the state 4, which may indicate the detection of the AVS start code, the state machine may return to the state 0 by following two arbitrary input bytes. In the state 5, the state machine may declare or indicate a detection of the start code emulation prevention bit string and a flag emu-det may be set to be logic true (1) to the bit processor 306. The state machine may transition back to the state 0 following two arbitrary input bytes. In the state 6, the state machine may indicate the detection of a PES header. A PES header detection flag pes-det may be set to be logic true (1). The number of zeros counted, zero_cnt, in the state 2 may be used in the state 6 to determine what state transition should occur. The state machine may transition to the state 2 with zero_cnt>1, to state 1 with zero_cnt=1, and then transition back to state 0 with zero_cnt=0. The state machine may start again for a new PES in the state 0. The bit processor 306 may operate similar to the operation described with respect FIG. 5.

Figure 9:
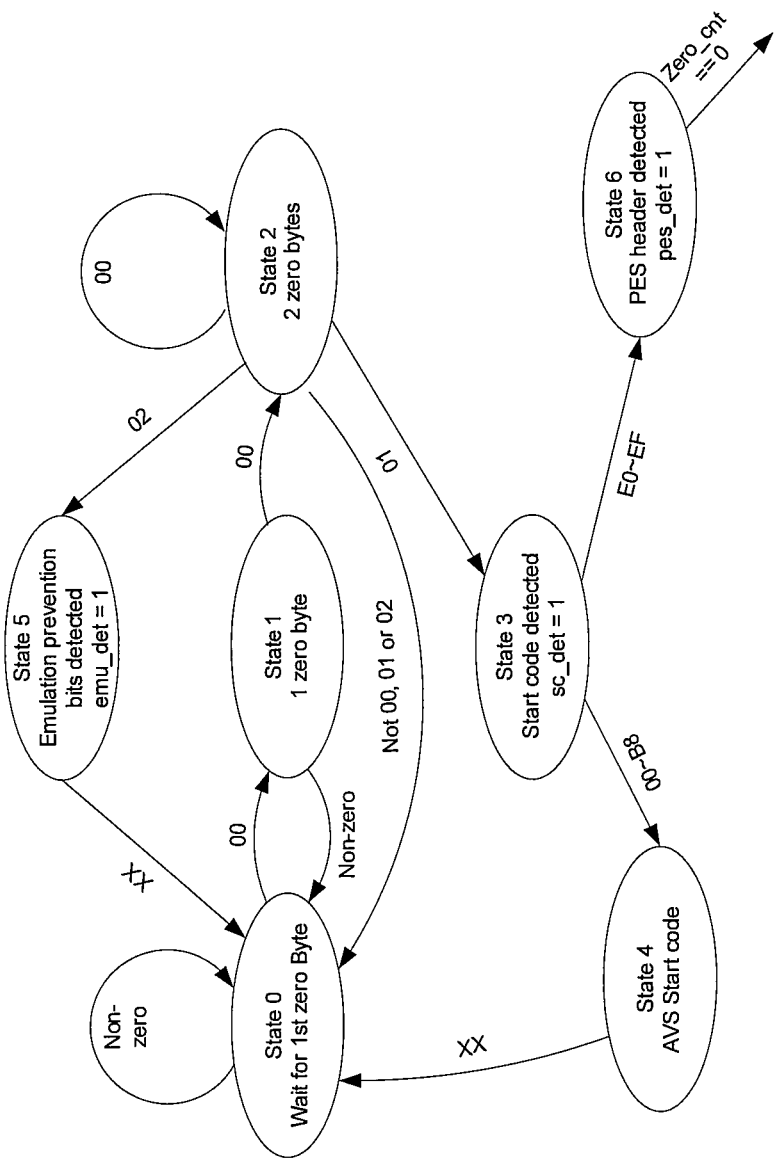
FIG. 9 is a state diagram illustrating exemplary unbounded PES parser with PES header restriction, in accordance with an embodiment of the invention.

FIG. 9 is a state diagram illustrating exemplary unbounded PES parser with PES header restriction, in accordance with an embodiment of the invention. Referring to FIG. 9, there is shown an exemplary state machine with a state 0, a state 1, a state 2, a state 3, a state 4, a state 5, and a state 6, a counter zero_cnt, a flag sc_det, a flag emu_det, and a flag pes_det.

The state machine may operate similar to the operation described with respect to FIG. 8 to transition among the state 0 through the state 6 according to different input byte values, except the state 6 may return to the state 0 with upcoming two input bytes of "00". Otherwise, the state machine may stay in the state 6. The bit processor 306 may operate similar to the operation described with respect to FIG. 5.

Figure 10:
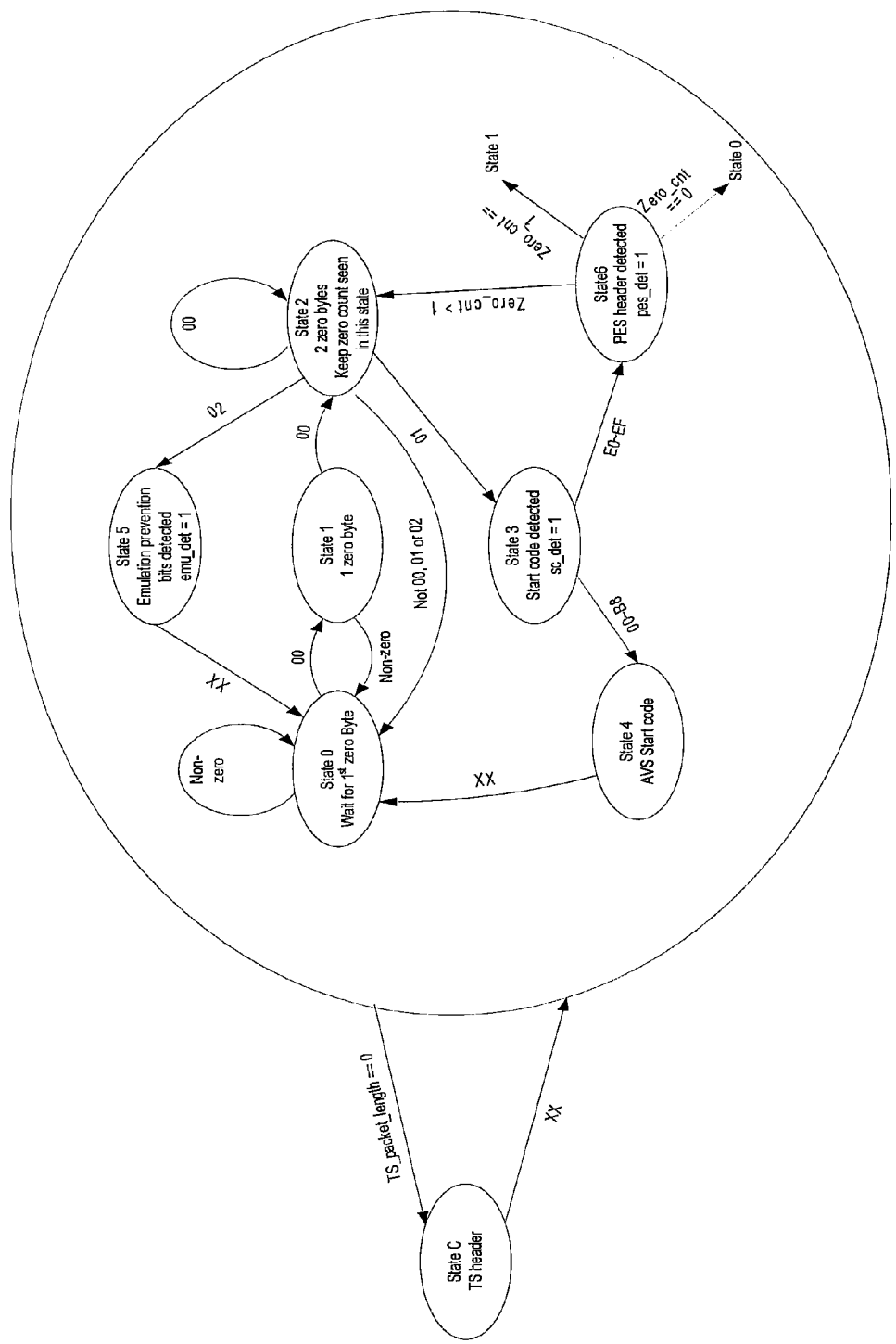
FIG. 10 is a state diagram illustrating exemplary AVS TS parser without using PUSI with PES payload restriction operation, in accordance with an embodiment of the invention.

FIG. 10 is a state diagram illustrating exemplary AVS TS parser without using PUSI with PES payload restriction operation, in accordance with an embodiment of the invention. Referring to FIG. 10, there is shown an exemplary state machine with a state C, a state 0, a state 1, a state 2, a state 3, a state 4, a state 5, and a state 6.

The state machine may start with the state C where a TS header may be detected. The state machine may transition to the state 0 with two arbitrary input bytes. The state machine may transition among the state 0 through the state 6 in the same way as described in the FIG. 8 except that the TS packet length (TS payload) need to be checked at each of the state 0 through the state 6. The detection of a zero for the TS packet length such as 224b may drive the state machine back to the state C from the corresponding states such as the state 3 or the state 4. The bit processor 306 may operate similar to the operation described with respect to FIG. 5.

Figure 11:
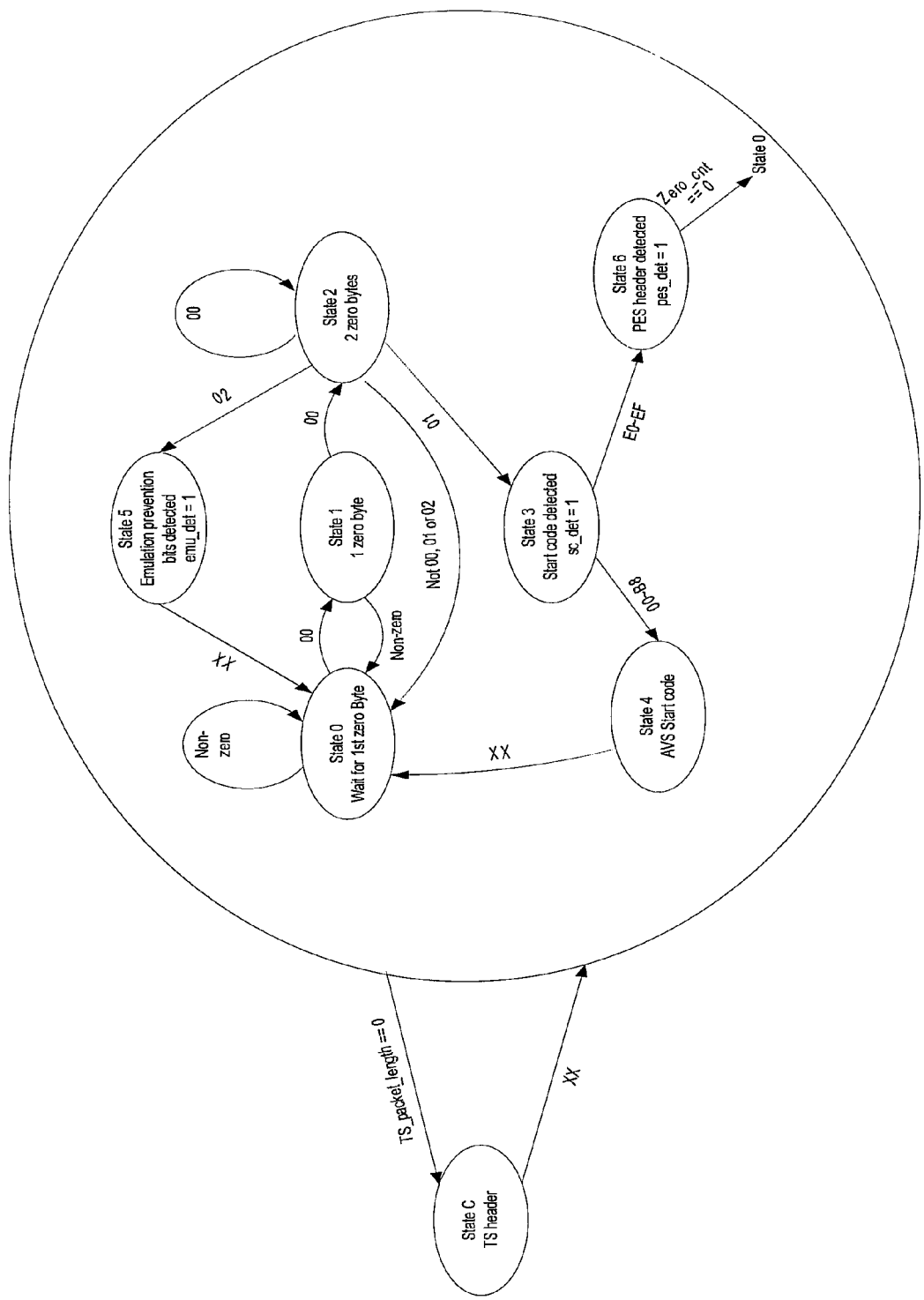
FIG. 11 is a diagram illustrating exemplary AVS TS parser without using PUSI with PES header restriction operation, in accordance with an embodiment of the invention.

FIG. 11 is a diagram illustrating exemplary AVS TS parser without using PUSI with PES header restriction operation, in accordance with an embodiment of the invention. Referring to FIG. 11, there is shown an exemplary state machine with a state C, a state 0, a state 1, a state 2, a state 3, a state 4, a state 5, and a state 6.

The state machine may operate in a manner somewhat similar to that which is described with respect to FIG. 10. In this regard, the state machine may transition among the state 0 through the state 6 and the state C according to different input byte values except the state 6 may return to the state 0 with upcoming two input bytes of "00," Otherwise, the state machine may remain in the state 6. The bit processor 306 may operate in a manner that may be similar to the operation described with respect to FIG. 5.

Aspects of a method and system for unified start code emulation prevention bits processing for AVS are provided. In accordance with various embodiments of the invention, a parser 304 may receive encoded data in, for example, a video unit, for example, an AVS PES 210 packet which may begin with the start code 212A. The parser 304 may search the received data to identify a start code emulation prevention bit string comprising plurality of start code emulation prevention bits, which may have an arbitrary bit string length, 2 bits, for example. Once the start code emulation prevention bit string may be detected, the parser 304 may process the received data by signaling to or otherwise providing an indication to the bit processor 306 to indicate the detection of the start code emulation bit string, as disclosed, for example, with respect to FIG. 4, FIG. 6, FIG. 7, FIG. 8, FIG. 9, FIG. 10, and FIG. 11.

The bit processor 306 may be operable to remove or ignore the start code emulation prevention bit string and proceed with its decoding process as disclosed, for example, with respect to FIG. 5. The video unit may be in the form of ES/PES/TS as shown in FIG. 1. Each ES/PES/TS may be headed by a start code. An ES may be carried in one or more PES packets and each PES packet such as the AVS PES 210 may be carried in one or more TS packet such as 222, 224, 226, and 228. Each start code in the received data may be detected and parsed by the parser 304. The detected start code may be stored in the SCB 310 to be used for applications such as PVR applications. For unbounded PES and TS with PUSI bit unset, the corresponding bitstreams may be parsed and processed as disclosed, for example, with respect to FIG. 8, FIG. 9, FIG. 10, and FIG. 11 with constraints added such as corresponding PES header may not be ended with a bit string of 00001 and/or corresponding PES header may be only inserted directly before the start code of the unbounded PES.

Another embodiment of the invention may provide a machine-readable storage, having stored thereon, a computer program having at least one code section executable by a machine, thereby causing the machine to perform the steps as described herein for unified start code emulation prevention bits processing for AVS.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing data, the method comprising:
receiving encoded data comprising at least one start code in a data stream;
detecting a start code emulation prevention bit string embedded in said received encoded data, wherein said embedded start code emulation prevention bit string comprises an arbitrary bit string length; and
processing said received encoded data based on said detection of said start code emulation prevention bit string,
wherein said data stream comprises an unbounded packetized elementary stream or a transport stream having a payload unit start indicator bit unset.

2. The method according to claim 1, comprising removing said embedded start code emulation prevention bit string from said received encoded data.

3. The method according to claim 1, wherein said arbitrary bit string length is 2 bits.

4. The method according to claim 1, wherein said data stream comprises an elementary stream.

5. The method according to claim 1, comprising storing said at least one start code.

6. The method according to claim 5, wherein said stored at least one start code is used for personal video recording applications.

7. The method according to claim 1, wherein a packetized elementary stream payload of said unbounded packetized elementary stream ends with a bit string other than 000001.

8. The method according to claim 1, wherein a packetized elementary stream header of said unbounded packetized elementary stream is inserted directly before said at least one start code.

9. A system of processing data, the system comprising:
at least one processor and memory including code executable by said at least one processor;
said at least one processor operable to receive encoded data comprising at least one start code in a data stream that is an unbounded packetized elementary stream;
said at least one processor operable to detect a start code emulation prevention bit string embedded in said received encoded data, wherein said embedded start code emulation prevention bit string comprises an arbitrary bit string length; and
said at least one processor operable to process said received encoded data based on said detection of said start code emulation prevention bit string.

10. The system according to claim 9, wherein said at least one processor is operable to remove said embedded start code emulation prevention bit string from said received encoded data.

11. The system according to claim 9, wherein said bit string arbitrary length is 2 bits.

12. The system according to claim 9, wherein said data stream is a transport stream.

13. The system according to claim 9, wherein said at least one processor is operable to store said at least one start code.

14. The system according to claim 13, wherein said stored at least one start code is used for personal video recording applications.

15. The system according to claim 12, wherein said transport stream has a payload unit start indicator bit unset.

16. The system according to claim 9, wherein a packetized elementary stream payload of said unbounded packetized elementary stream ends with a bit string other than 000001.

17. The system according to claim 9, wherein a packetized elementary stream header of said unbounded packetized elementary stream is inserted directly before said at least one start code.

18. A non-transitory machine-readable storage media having stored thereon a computer program having at least one code section for processing data, the at least one code section being executable by a machine for causing the machine to perform steps comprising:
receiving encoded data comprising at least one start code in a data stream;
detecting a start code emulation prevention bit string embedded in said received encoded data, wherein said embedded start code emulation prevention bit string comprises an arbitrary bit string length; and processing said received encoded data based on said detection of said start code emulation prevention bit string, wherein said data stream comprises an unbounded packetized elementary stream or a transport stream having a payload unit start indicator bit unset.

19. The non-transitory machine-readable storage media according to claim 18, wherein said at least one code section comprises code for removing said embedded start code emulation prevention bit string from said received encoded data.

20. The non-transitory machine-readable storage media according to claim 18, wherein said arbitrary bit string length is 2 bits.

21. The non-transitory machine-readable storage media according to claim 18, wherein said data stream comprises an elementary stream.

22. The non-transitory machine-readable storage media according to claim 18, wherein said at least one code section comprises code for storing said at least one start code.

23. The non-transitory machine-readable storage media according to claim 22, wherein said stored at least one start code is used for personal video recording applications.

24. The non-transitory machine-readable storage media according to claim 18, wherein a packetized elementary stream payload of said unbounded packetized elementary stream ends with a bit string other than 000001.

25. The non-transitory machine-readable storage media according to claim 18, wherein a packetized elementary stream header of said unbounded packetized elementary stream is inserted directly before said at least one start code.

* * * * *